(12) United States Patent
Ferkinhoff et al.

(10) Patent No.: US 6,304,833 B1
(45) Date of Patent: Oct. 16, 2001

(54) HYPOTHESIS SELECTION FOR EVIDENTIAL REASONING SYSTEMS

(75) Inventors: David J. Ferkinhoff, Middletown; Sherry E. Hammel, Portsmouth; Kai F. Gong, Pawtucket; Steven C. Nardone, Narragansett, all of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/301,383

(22) Filed: Apr. 27, 1999

(51) Int. Cl.⁷ ....................................................... G06F 17/50
(52) U.S. Cl. .................... 703/2; 706/12; 706/13; 706/47; 706/52; 706/49; 382/103; 382/240; 324/345
(58) Field of Search .................. 703/2, 3; 706/49, 706/12, 13, 14, 9, 47, 52; 382/103, 226, 240, 450; 324/323, 345; 342/450

(56) References Cited

U.S. PATENT DOCUMENTS

| | | | |
|---|---|---|---|
| 4,542,744 | * | 9/1985 | Barnes et al. .......................... 128/660 |
| 5,045,852 | * | 9/1991 | Mitchell et al. ........................ 341/51 |
| 5,222,197 | * | 6/1993 | Teng et al. ............................. 395/68 |
| 5,233,541 | * | 8/1993 | Corwin et al. ........................ 364/518 |
| 5,373,456 | * | 12/1994 | Ferkinhoff et al. ................... 364/574 |
| 5,402,524 | * | 3/1995 | Bauman et al. ....................... 395/50 |
| 5,581,490 | * | 12/1996 | Ferkinhoff et al. ................... 364/578 |
| 5,625,748 | * | 4/1997 | McDonough et al. ................ 395/2.6 |
| 5,777,948 | * | 7/1998 | Ferkinhoff et al. ................... 367/131 |
| 5,787,235 | * | 7/1998 | Smith et al. ........................... 395/50 |
| 6,055,523 | * | 4/2000 | Hillis ..................................... 706/13 |
| 6,249,252 | * | 6/2001 | Dupray .................................. 342/450 |

\* cited by examiner

Primary Examiner—Kevin J. Teska
Assistant Examiner—Thai Phan
(74) Attorney, Agent, or Firm—Michael J. McGowan; Michael F. Oglo; Prithvi C. Lall

(57) ABSTRACT

A method for the selection of hypotheses for modeling physical phenomena, includes detecting if selected features are present by analyzing actual sensed data and parameter values of an initial physical phenomena model; comparing feature estimating hypotheses to the actual data for determining a belief probability assignment value (bpa) for each of the hypotheses which indicates the likelihood that the selected features exist in the actual data and the likelihood that such selected features cannot accurately be determined as existing due to the presence of noise; selecting a set of the hypotheses most accurately modeling the physical phenomena based on the bpa of each selected hypotheses meeting a predetermined criteria; generating evidential support values and lack of evidential support values for subsets of the set having non-zero subset bpa's; ranking the subsets having non-zero subset bpa's in order of decreasing subset bpa; unioning subsets of the power set for forming unioned subsets and determining support values and plausibility values for the unioned subsets; comparing the unioned evidential support values to a predefined threshold value; and using at least one of the unioned subsets having a unioned evidential support value most closely approximating or exceeding the threshold value for selecting alternate models having selected features which more closely approximate the actual data.

27 Claims, 9 Drawing Sheets

|  | BPA | SUPPORT | PLAUSIBILTY |
|---|---|---|---|
| $\{H_0,H_1,H_2,H_3\}$ | 0 | 1 | 1 |
| $\{H_1,H_2,H_3\}$ | 0 | 0.80 | 1 |
| $\{H_0,H_2,H_3\}$ | 0 | 0.40 | 0.97 |
| $\{H_0,H_1,H_3\}$ | 0 | 0.88 | 0.88 |
| $\{H_0,H_1,H_2\}$ | 0 | 0.35 | 0.72 |
| $\{H_2,H_3\}$ | 0 | 0.40 | 0.77 |
| $\{H_1,H_3\}$ | 0.37 | 0.68 | 0.88 |
| $\{H_1,H_2\}$ | 0 | 0.15 | 0.72 |
| $\{H_0,H_3\}$ | 0 | 0.28 | 0.85 |
| $\{H_0,H_2\}$ | 0 | 0.12 | 0.32 |
| $\{H_0,H_1\}$ | 0.20 | 0.23 | 0.60 |
| $\{H_3\}$ | 0.28 | 0.28 | 0.65 |
| $\{H_2\}$ | 0.12 | 0.12 | 0.12 |
| $\{H_1\}$ | 0.03 | 0.03 | 0.60 |
| $\{H_0\}$ | 0 | 0 | 0.20 |

*FIG. 9* (TABLE 1)

| SORTED NUMBER |  | BPA |
|---|---|---|
| B1 | $\{H_1,H_3\}$ | 0.37 |
| B2 | $\{H_3\}$ | 0.28 |
| B3 | $\{H_0,H_1\}$ | 0.20 |
| B4 | $\{H_2\}$ | 0.12 |
| B5 | $\{H_1\}$ | 0.03 |

*FIG. 10A*

| UNIONED NUMBER |  | ADDED BPA | SUPPORT | PLAUSIBILTY |
|---|---|---|---|---|
| C1=B1 | $\{H_1,H_3\}$ | 0.37 | 0.68 | 0.88 |
| C2=B1∪B2 | $\{H_1,H_3\}$ | 0.28 | 0.68 | 0.88 |
| C3=B1∪B2∪B3 | $\{H_0,H_1,H_3\}$ | 0.20 | 0.88 | 0.88 |
| C4=B1∪B2∪B3∪B4 | $\{H_0,H_1,H_2,H_3\}$ | 0.12 | 1.0 | 1.0 |

*FIG. 10B*

HYPOTHESIS SELECTION FOR EVIDENTIAL REASONING SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention is directed to a system and method for the efficient selection of hypotheses used in connection with mathematical modeling of the type used when estimating the motion of physical phenomena, for example, torpedoes, via the results of an evidential reasoner, and more particularly, to a system and method for assessing models of motion through a fluid, resulting in an acoustic signal, wherein the signal traverses an uncertain path and is received by sensors with uncertain biases in the presence of noise. Accordingly, a hypothesis selection criterion for use with the Dempster-Shafer (DS) frame of evidential reasoning that is both conceptionally simple and computationally efficient, is provided.

(2) Description of Prior Art

The Dempster-Shafer (DS) theory of evidential reasoning is one of several approaches for producing inferences from uncertain information. Its appeal for application to model assessment is that it intrinsically accommodates the expression of ignorance and naturally provides a convenient framework on which a Contact Management Model Assessment problem can be structured. The basic structure for DS evidential reasoning is the frame of discernment. Denoted by $\theta$, the frame of discernment is a set of mutually exclusive and exhaustive hypotheses:

$$\theta = \{H_1 \ldots H_N\} \quad (1)$$

The power set is the set of all subsets in the frame of discernment and has $$K = 2^{|\theta|} - 1 \quad (2)$$

elements, where $|\theta|$ is the cardinality of the set $\theta$, and the minus one accounts for the null set $\emptyset$ which is not considered a member of the power set in DS theory. FIG. 4 illustrates a generic power set. A basic probability assignment (bpa) is assigned to each member of the power set, $A_i$, and represents the belief that the hypotheses of $A_i$ are true. Denoted by $m(A_i)$, the individual bpa's are bounded between zero and one, while their sum is unity. Additionally, the measures of plausibility and support for each element can also be computed. The support for $A_i$, denoted by $s(A_i)$, is the sum of the bpa's over all the subsets of $A_i$, i.e., $$s(A_i) = \sum_{a \subseteq A_i} m(a) \quad (3)$$

where:
m=amount of bpa
a $\subset$ A_i => summation over the entire power set
$\subseteq$ =subset or equivalent
$S(A_i)$ represents the level of belief that directly supports the hypotheses of $A_i$. The plausibility of $A_i$, i.e.

$p(A_i)$, is a measure of the lack of support in the complement of $A_i$ and is one minus the support in the complement of $A_i$, i.e., $$p(A_i) = 1.0 - S(\overline{A_i}) = \sum_{a \cap A_i \neq \phi} m(a) \quad (4)$$

where $\cap$=intersection

In general, support is less than or equal to plausibility and both are bounded by zero and one. The uncertainty in assigning belief to the hypotheses contained in element $A_i$ is the difference between the plausibility and support. DS theory includes Bayesian probability as a special case when all belief is distributed among the singleton sets $[H_1]$, $[H_2], \ldots, [H_N]$. If several bodies of evidence exist for a frame of discernment, the resulting beliefs can be combined using the DS combination rule, $$m_c(A_i) = \frac{1}{a} \sum_{A_j \cap A_k = A_i} m_1(A_j) m_2(A_k), \quad (5)$$

where $m_1(A_j)$ and $m_2(A_k)$ are the belief in $A_j$ and $A_k$ generated from two bodies of evidence represented in frames of discernment one and two, respectively. The term $\alpha$ is the renormalization constant necessary to account for belief being placed into the null intersection $\emptyset$ and is $$\alpha = 1 - \sum_{A_j \cap A_k \neq \phi} m_1(A_j) m_2(A_k) \quad (6)$$

In both expressions, the indices j and k range over all the elements of the power set. DS combination rule is both commutative and associative. Compatibility relations, which are used to map belief in one frame of discernment to a different frame of discernment, are useful for combining belief that originates in dissimilar frames into belief in a common frame of discernment. The compatibility map defines the relationship between the elements of two frames of discernment $\theta_{A,B}$ where $$\theta_{A,B} \subset \theta_A \times \theta_B \quad (7)$$

and the compatibility mapping is defined by $$C_{A \rightarrow B}(A_k) = \{b_j | (a_1, b_j) \in \theta_{A,B}, a_i \in A_k\} \quad (8)$$

where at least one pair $(a_i, b_j)$ is specified for each of the $A_K$ in $\theta_A$. With a network of compatibility relations, different frames of discernment can be linked together. The collection of frames of discernment and compatibility relations is called a gallery.

The prior art includes the various model selection processes, none of which are related to the Dempster-Shafer frame of evidential reasoning, which are discussed below.

U.S. Pat. No. 5,045,852 to Mitchell et al. discloses a system and method for maximizing data compression by optimizing model selection during coding of an input stream of data symbols. In the system and method, at least two models are run and compared, and the model with the best coding performance for a given-size segment or block of compressed data is selected such that only its block is used in an output data stream. The best performance is determined by 1) respectively producing comparable-size blocks of compressed data from the input stream with the use of the two, or more models and 2) selecting the model which compresses the most input data. In the preferred embodiment, respective strings of data are produced with each model from the symbol data and are coded with an adaptive arithmetic coder into the compressed data. Each block of compressed data is started by coding the decision to use the model currently being run and all models start with the arithmetic coder parameters established at the end of the preceding block. only the compressed code stream of the best model is used in the output and that code stream has in it the overhead for selection of that model. Since the decision as to which model to run is made in the compressed data domain, i.e., the best model is chosen on the basis on which model coded the most input symbols for a given-size compressed block, rather than after coding a given number of input symbols, the model selection decision overhead scales with the compressed data. Successively selected compressed blocks are combined as an output code stream to produce an output of compressed data, from input symbols, for storage or transmission. In Mitchell et al., the process disclosed always performs all the processing and chooses the best result after the processing is performed, without ranking which models produce the best results prior to processing.

U.S. Pat. No. 5,233,541 to Corwin et al. discloses an automatic target detection process. Accordingly, a data processing technique is provided for detecting, locating and identifying targets from a plurality of images generated by an imaging sensor such as an imaging lidar system. The process employs physical models of signals produced by target objects of interest. Such a model based detection system globally processes frames of data to determine the existence and location of component elements that characterize the target being modeled. Similar to Mitchell et al., the process disclosed in Corwin et al. chooses only the best result after all processing is finished instead of ranking and selecting models which could produce the best results, prior to processing. Also, the model developed by Corwin et al. is of a target's orientation in a still frame, thereby not taking into account target kinematics, environmental conditions and sensor characteristics.

The prior art discussed above relies strictly on Bayesian approaches, and unlike the present invention, it is not a selection method which is applicable to a broad range of systems such as the Bayesian system, the Dempster-Shafer system and fuzzy theory based systems, all of which have different types of uncertainties which need to be accommodated for producing the best model.

Systems related to the present invention for modeling and assessing the accuracy of assumed models of physical phenomena and which provide alternate model selections in connection with information concerning the model in the presence of noise exist in the prior art or are otherwise known. One such system and method which is in the prior art is disclosed in U.S. Pat. No. 5,373,456, assigned to the assignee of the present invention, and entitled "An Expert System for Assessing Accuracy of Models of Physical Phenomena and for Selecting Alternate Models in the Presence of Noise". This patent is incorporated into the present invention and discussed in detail in the following Detail Description of the Preferred Embodiment. Another such system and method which is known is disclosed in U.S. Pat. No. 5,581,490 entitled "Contact Management Model Assessment System for Contact Management in the Presence of Model Uncertainty and Noise", assigned to the assignee of the present invention, which also is incorporated by reference and discussed in further detail in the Detail Description of the Preferred Embodiment, below. These relevant systems suffer from the defects that they do not effectively select the most appropriate models or set of models from a plurality of models whose model state information is maintained in storage. That is, in these relevant systems, model selection, compilations of bpa (discussed above for DS evidential reasoning), support and plausibility are required for all hypothesis elements in the set of hypotheses, and all subsets of the hypotheses, placing a high computational burden on the processing capability of the system.

There exists a need, therefore, for a hypothesis selection method for modelling physical phenomena which system and method is applicable for use with the Dempster-Shafer frame of evidential reasoning as well as the Bayesian based systems and fuzzy theory based systems, and which takes into account such parameters as target kinematics, environmental conditions and sensor characteristics.

SUMMARY OF THE INVENTION

The primary object of this invention is to provide a method and system for the efficient selection of hypotheses for modeling physical phenomena based on the results of an evidential reasoner.

Another object of this invention is to provide a method and system for assessing models of motion of physical phenomena through a fluid, which motion causes an acoustic signal that traverses an uncertain path which is received by sensors with uncertain biases, in the presence of noise.

Still another object of this invention is to provide a method and system for ranking hypotheses of models of physical phenomena, such that the processing capability of the system using the method and system of the present invention is enhanced.

And still another object of this invention is to provide a method and system for accurately and efficiently selecting models of physical phenomena which entails a development of hypothesis selection criterion and which is applicable to the Dempster-Shafer frame of evidential reasoning as well as fuzzy logic based systems, Bayesian systems and rule based systems.

Yet another object of this invention is to provide a method and system for efficiently selecting models of physical phenomena such that the selection is made in the most efficient manner with the fewest computations possible.

A method in accordance with the principles of the present invention for the selection of hypotheses for modelling physical phenomena, for achieving the objects and advantages set forth herein comprises the selection steps of sensing actual data from the physical phenomena; providing an initial model of the physical phenomena comprising mathematical models which represent the actual data if the actual data was sensed in the absence of noise; detecting if selected features are present by analyzing the actual data and parameter values; extracting the selected features if present using hypotheses for estimating the selected features; comparing the hypotheses to the actual data for determining a belief probability assignment value for each of the hypotheses which indicates the likelihood that the selected features exist in the actual data and the likelihood that such selected features cannot accurately be determined as existing due to the presence of noise and for determining the strength and variance of the estimated selected features as represented by the hypotheses relative to the actual data; interpreting the features to determine the hypothesized modeling error/errors which could have produced said features in the type of measurement in which the features were found by mapping the belief probability assignments in the features to belief probability assignments in the hypothesized modeling errors via the compatibility mapping described earlier; combining the bpa in the modeling errors via DS combination rule described earlier; selecting a set of the modeling error hypotheses believed to most accurately model the physical phenomena based on the support values of the smallest set of hypotheses meeting a predetermined criteria by generating support values and plausibility values for each of the elements of the power set having non-zero belief probability assignment values, wherein the support value is indicative of the amount of confirming evidence for each of the subsets of modeling error hypotheses in the power set and the plausibility value is indicative of a lack of supporting evidence for each of the subsets of modeling error hypotheses in the power set; ranking the subsets having non-zero belief probability assignment values in order of decreasing bpa values; unioning the ranked subsets of the power set in order of decreasing bpa value for forming unioned subsets and determining support values for the unioned subsets; thresholding the unioned subsets by comparing the support values for the unioned subsets to a predefined threshold value; and using the selected unioned subsets having a support value most closely exceeding the threshold value for selecting alternate models which would have produced the selected features which more closely approximate the actual data.

A system for the selection of hypotheses for modelling physical phenomena, in accordance with the principles of the present invention for achieving the objects and advantages set forth herein comprises means for sensing actual data from the physical phenomena, and initial model storage means for providing an initial model of the physical phenomena comprising mathematical models which represent the actual data if the actual data was sensed in the absence of noise. Feature estimator means is used for detecting if selected features are present by analyzing the actual data and parameter values along with feature extraction means for extracting the selected features if present by using hypotheses for estimating the selected features. Also, feature and hypotheses representation means are used for comparing the hypotheses to the actual data for determining a belief probability assignment value for each of the hypotheses which indicates the likelihood that the selected features exist in the actual data and the likelihood that such selected features cannot accurately be determined as existing due to the presence of noise and for determining the strength and variance of the estimated selected features as represented by the hypotheses relative to the actual data. Feature interpretation means are provided for selecting a set of modeling error hypotheses believed to most accurately model the physical phenomena based on the belief probability assignment values of the feature hypotheses and concurrently mapping the bpa associated with the feature hypotheses to the modeling error hypotheses via compatibility relations. In addition, evidential reasoning means for generating evidential support values and lack of evidential support values for each of the subsets of modeling error hypotheses having non-zero belief probability assignment values, wherein the evidential support value is indicative of the amount of confirming evidence for each of the hypotheses in the subset and the lack of evidential support value is indicative of a lack of supporting evidence for each of the hypotheses in the subset, and further for ranking the subsets having non-zero subset belief probability assignment values in order of decreasing subset belief probability assignment values within a power set, are used. Model selection means are further used for unioning the ranked subsets of the power set for forming unioned subsets and determining support values for the unioned subsets, and for thresholding the unioned subsets by comparing the support values for unioned subsets to a predefined threshold value. Finally, alternate model storage means are provided for using the selected unioned subsets having a unioned evidential support value most closely exceeding the threshold value for selecting alternate models having selected features which more closely approximate the actual data.

The details of the present invention are set out in the following description and drawings wherein like reference characters depict like elements.

BRIEF DESCRIPTION OF THE DRAWINGS

FIG. 9 shows Table 1 which, similar to FIGS. 6–8, illustrates the results of the use of the present invention as applied to target tracking; and FIGS. 10A and 10B show Tables 2 and 3, respectively, indicating the selection method of hypotheses and successive level cuts.

DESCRIPTION OF THE PREFERRED EMBODIMENT

Figure 1:
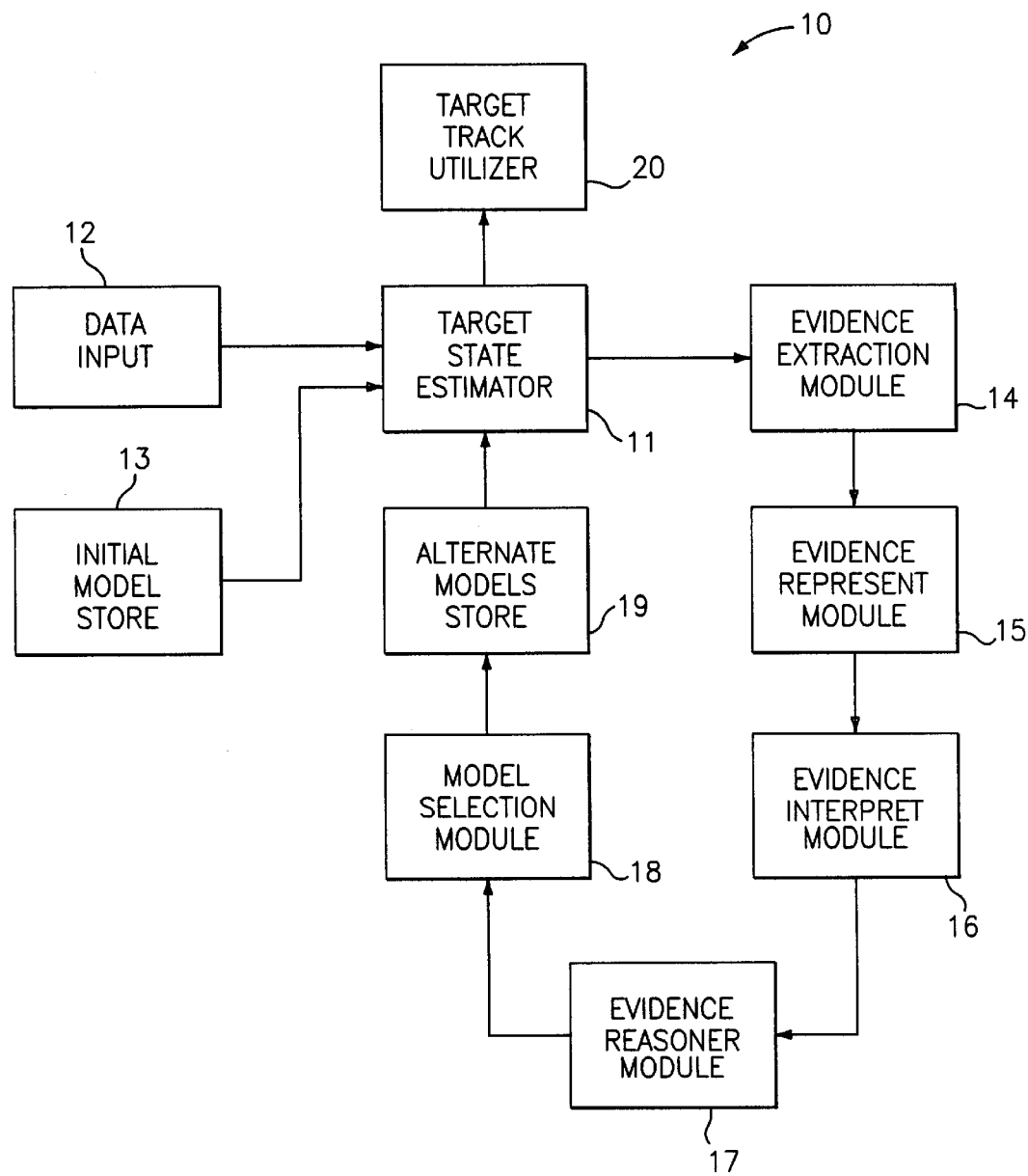
FIG. 1 is a flow diagram of a target tracking system of the prior art wherein a method and system for selecting hypotheses for modeling physical phenomena, such as a moving target, is used.
Figure 1A:
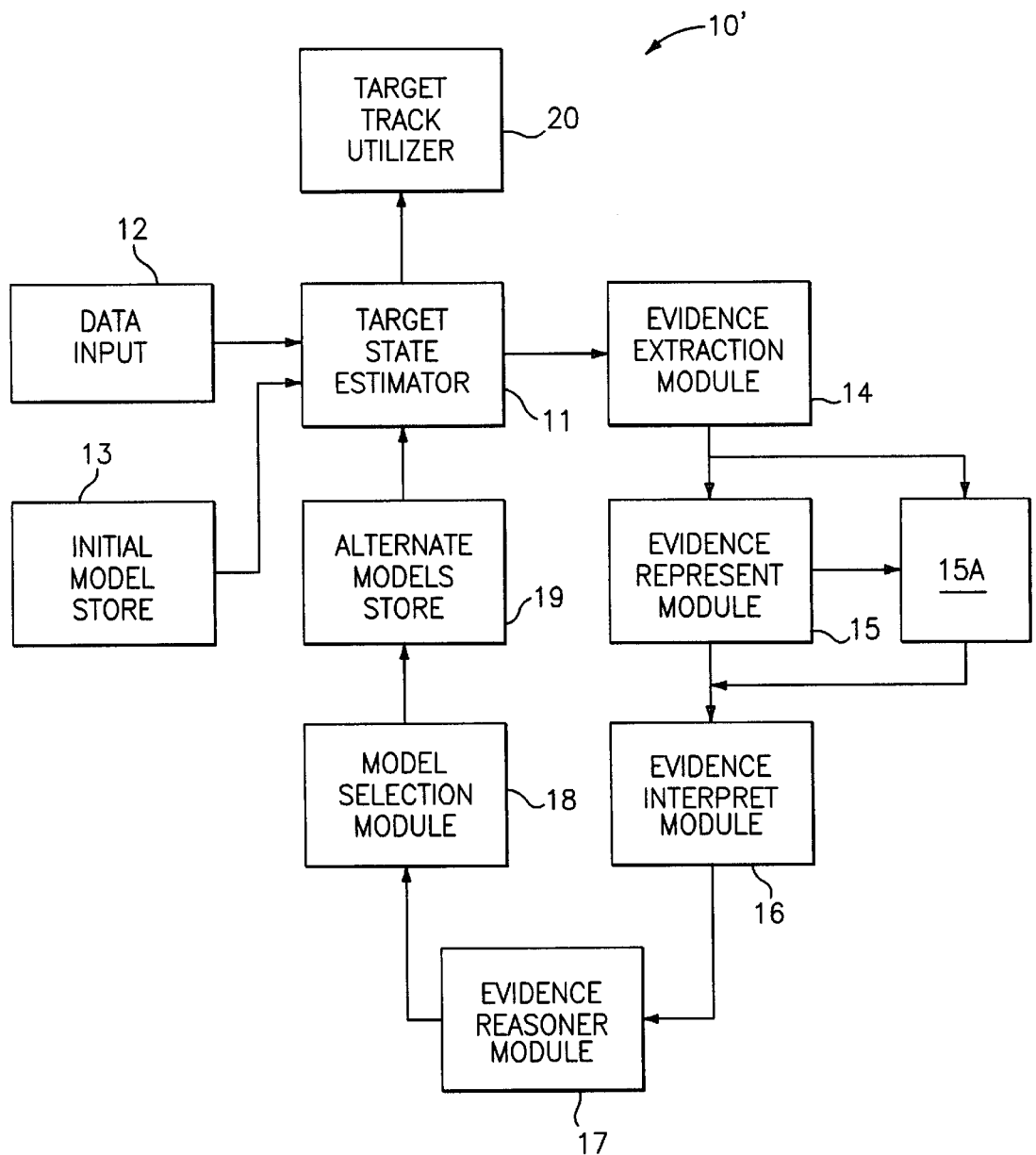
FIG. 1A is a prior art flow diagram similar to FIG. 1 but including advancement over the system of FIG. 1.

Referring now to the drawings in detail, there is shown in FIGS. 1 and 1A flow diagrams for prior art systems for a target tracking system, designated generally as 10 and 10', which are used with the system and method of the present invention. The present invention is for use in module 18. Reference is made to U.S. Pat. No. 5,373,456 assigned to the assignee of the present invention and U.S. Pat. No. 5,581, 490 also assigned to the assignee of the present invention, for a detailed description of the prior art systems used in connection with the present invention. The technology disclosed therein is hereby incorporated by reference thereto with specific reference to columns 3–8 of U.S. Pat. No. 5,373,456 and columns 4–15 of U.S. Pat. No. 5,581,490. An abbreviated description of the prior art shown in FIGS. 1 and 1A follows.

FIG. 1 depicts a functional block diagram of a target tracking system 10 constructed in accordance with a prior art invention and described in detail in U.S. Pat. No. 5,373,456. Module 15A is not a part of this first prior art system and is discussed below with further reference to the FIG. 2 system. With reference to FIG. 1, the target tracking system 10 includes a target state estimator module 11 which receives input data from a sensor array through a sensed data input 12 and initially receives an initial target tracking model from an initial model store 13. With respect to one particular embodiment of the target state tracking system, the input data received through the data input 12 represents the values of signals from various acoustic sensors (not shown) which provide an indication of various angular relationships of received acoustic signals with respect to the positions of the sensors and the frequencies of the received acoustic signals. The target state estimator module 11 processes the data representing the signals in connection with an initial tracking model it receives from the initial model store 13 and generates target state estimation data, a by-product of which is the generation of residual values, which it provides to an evidence or feature extraction module 14. The initial tracking model received from the initial model store 13 comprises mathematical models which represent the values of the data input 12 which would be expected if the target were on a predetermined track in the absence of noise.

The evidence or feature extraction module 14 processes residual values indicating the differences between the target state estimation data and the actual input data for detecting the selected features, i.e., to determine probability values representing the likelihood that selected features are present in the residual values representing the input data, which are not reflected in the initial tracking model received from the initial model store 13. These features include, for example, a generally linear drift of the signal, a discontinuity or jump in the signal, or a non-linearity or curvature of the signal. The evidence representation module 15 may separately generate these probabilities for data representing each signal from the sensor array (not shown). The evidence or feature representation module 15 generates the probabilities for each feature, and accordingly, determines not only the probabilities that such features are present or are not present, but also determines a probability value representing the likelihood that it cannot determine whether a feature exists due to noise in the signal representing fluctuations in the data values.

The probability values for the various features of drift, jump, and curvature, including the probabilities that the features exist, do not exist and are not determinable, are used by an evidence interpretation module 16 and an evidential reasoning module 17 for enabling the model selection module 18 to select one or more models from the plurality of models whose models state information is maintained in the alternate models store 19. The alternate models store 19 couples the model state information for the selected model(s) to the target state estimator module 11 for use in a next iteration. The various modules of the system then repeat the above-described operations using the new tracking model parameter values for each of the selected alternate tracking models. The target tracking system 10 performs these operations iteratively. During each iteration the target state estimator module 11 processes the input data in relation to the alternate tracking model data for the alternate tracking models which the model selection module had selected during the previous iteration. This continues until the smallest set of tracking models which produce consistent results is identified. Thereafter, the target state estimator module 11 preferably provides the identified target tracking models to a utilization device 20, which may utilize the target state information, to, for example, further process the target state information provided by the target state estimator 11, generate an alarm indication or display the information for an operator.

Figure 2:
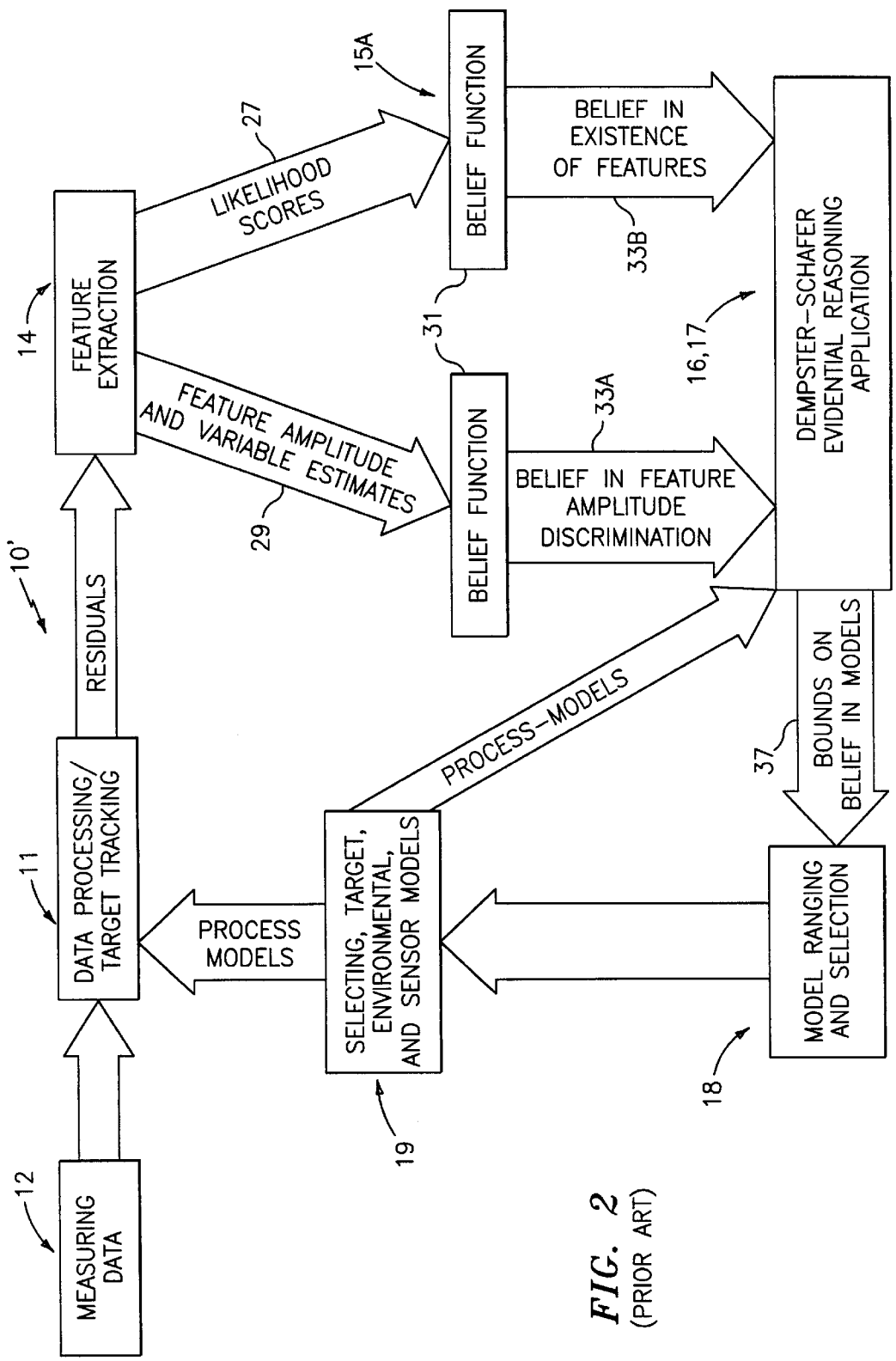
FIG. 2 is a detailed operational flow diagram of the more advanced prior art system shown in FIG. 1A which uses many of the same features as the embodiment shown in FIG. 1.

This prior art invention has been modified by adding another module, feature representation and interpretation module 15A, as shown in FIG. 1A, which constitutes the other prior art invention incorporated herein, as indicated above with reference to patent application Ser. No. 08/353,853. Referring to FIGS. 1A, and 2 while the previously described prior art determines the likelihood that particular features are present, this prior art invention determines how strong the belief is that such features, if they exist, have amplitudes which fall in fuzzily defined regions (e.g., weak, moderate, strong).

Referring to FIG. 2 in conjunction with FIG. 1A, the operational steps of the modules of this second prior art system 10' are described. The data received from the evidence extraction module 14 is processed under a baseline model, or null hypothesis, to produce a target state estimate. The baseline model is a constant-velocity contact with direct-path signal arrival and zero-mean measurement noise. It is initially assumed that there are no anomalies or features present in this model. If anomalies are detected in the measured data 12 or in the residuals formed by the data processors 11, a statistical multi-hypotheses test is applied to the residuals to extract certain model features in module 14. Thus, two distinct outputs are generated: firstly are features likelihood scores 27 and secondly are feature amplitude and variance estimates 29. The feature likelihood scores 27 are produced by comparing the extracted feature to that of zero mean measurement noise and results in the likelihood that the features are present in the data sequence. The feature amplitude and variance estimates 29 are a byproduct of the production of the likelihood scores 27. Belief functions 31 in module 15A map the results of the feature extractor 14 to beliefs 33a and 33b usable by evidential reasoning system 16 and 17, wherein each output is then operated on by the separate belief functions 31 which determine the belief 33b in the existence of the relevant features and the belief 33a in feature amplitude discrimination.

The evidential or feature reasoning system 16 and 17 applies Dempster-Schafer evidential reasoning 35 and performs the following steps: (a) mapping the beliefs in the existence and amplitude of the features into beliefs in the set of hypothesized models which could have caused the observed features for each measurement type from each sensor; (b) combining the belief in the modeling hypotheses to refine the belief in the hypothesized models; (c) generating a plausibility measure which indicates a lack of supporting evidence for the complement of a hypothesis or a set of hypotheses; and (d) generating a support measure which indicates the amount of confirming evidence for a hypothesis or set of hypotheses. In principle, the support and plausibility measures provides lower and upper bounds 37, respectively, representing the belief in the hypothesis or set of hypotheses. The lower and upper bounds 37 are used to select and rank model hypotheses for subsequent processing. Finally, the analysis is repeated for selected model subsets.

The disadvantage with the above discussed prior art inventions is that module 18 of FIGS. 1, 1A and 2 do not effectively select the most appropriate model or set of models from the plurality of models having model state information maintained in the alternate model store 19. That is, in the prior art model selection, computations of bpa, support and plausibility are required for all elements of the power set, the set of hypotheses, and all subsets of the hypotheses, placing a high computational burden on the processing capability of the system.

The present invention, which is an improvement on module 18 in FIGS. 1, 1A and 2, presents an efficient method for hypothesis selection from the Dempster-Shafer (DS) frame for evidential reasoning. The invention provides a hypothesis selection criterion for the DS frame of evidential reasoning while remaining computationally efficient.

The system and method described below is applicable to modeling various physical phenomena. The particular and preferred application is for use in modeling moving targets, as with the prior art discussed above, such as those encountered in military operations. However, the scope of this invention is not limited to this preferred application and is considered to encompass the modeling of many forms of such physical phenomena.

The preferred format for implementing the present invention is computer software and the resultant system created when using such software in conjunction with a computer system.

Figure 3:
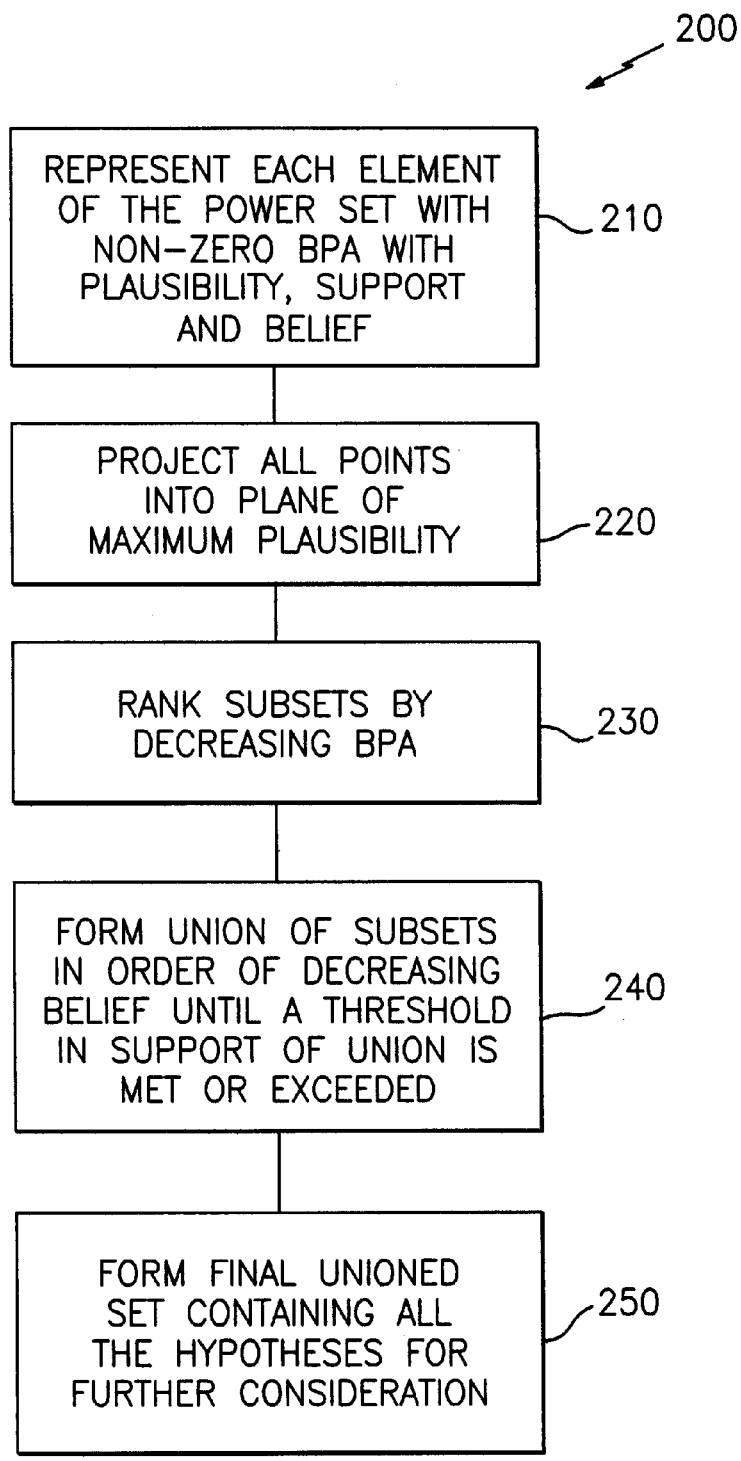
FIG. 3 is a simplified flow chart of the method steps for selecting hypotheses using the Dempster-Shafer frame of evidential reasoning, in accordance with the principles of the present invention.

Referring to FIG. 3, a simplified flow chart of the system and method of the present invention is shown, designated generally as 200. In general, the method ranks the members of the power set of hypotheses by the basic probability assignments and accumulates them in decreasing order through a union operation. The method is continued until the support of the set obtained by the union operation meets or exceeds a specified threshold. The primary steps of the method and implemented by the system of the present invention include step 230, ranking the members of a hypothesis power set by their bpa (basic probability assignment) values; and step 240, accumulating the bpa's in decreasing order through successive union operations and performing thresholding upon the value of support and for the successively unioned hypotheses. Step 240 of performing thresholding includes the step of determining when the support for a unioned set equals or exceeds a predetermined threshold having a decimal value less than 1.00. The union set that first reaches this threshold contains the selected alternate modeling hypothesis or set of hypotheses. A selection is always guaranteed to occur although the number of hypotheses selected for further processing will be dependent on the amount and fidelity of the evidence generated by the preceding stages.

The detail of the system and method of the present invention is now described with reference to the prior art systems and methods discussed above for FIGS. 1, 1A and 2 and the Dempster-Shafer theory of evidential reasoning discussed in the background section.

The invention is directed to a selection method and system for use with the DS frame of evidential reasoning, as shown in the flowchart in FIG. 3. Consider a frame composed of the set of N mutually exclusive and exhaustive hypothesis, $$\theta_N = \{H_1, \ldots, H_N\} \tag{9}$$

As previously noted, there are three useful measures of the set $A_1$, firstly the bpa, secondly support and thirdly plausibility. Although the interrelation of these three quantities is often complex for large frames, insight to this information is obtained using a geometric interpretation of these measures, as shown in FIG. 5.

Figure 4:
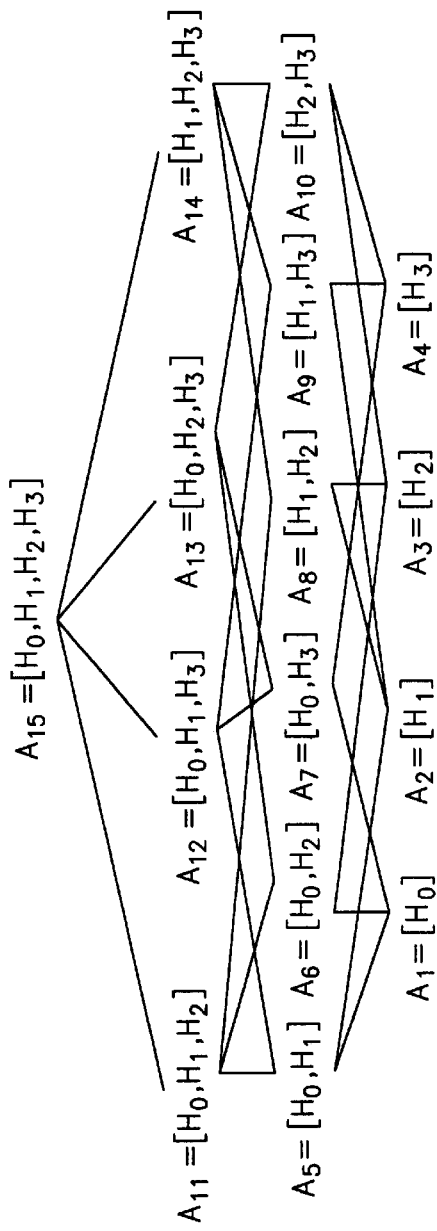
FIG. 4 is a graphical illustration of a power set used in accordance with the principles of the present invention.

Referring to step 210 of FIG. 3, elements $A_i$ of the power set, as shown in FIG. 4 and described above in the Background, are represented by points in the three dimensional space of real numbers $R^3$ with coordinates of plausibility, support, and belief, denoted by $$f(A_i) = [p(A_i)s(A_i), m(A_i)] \tag{10}$$

Figure 5:
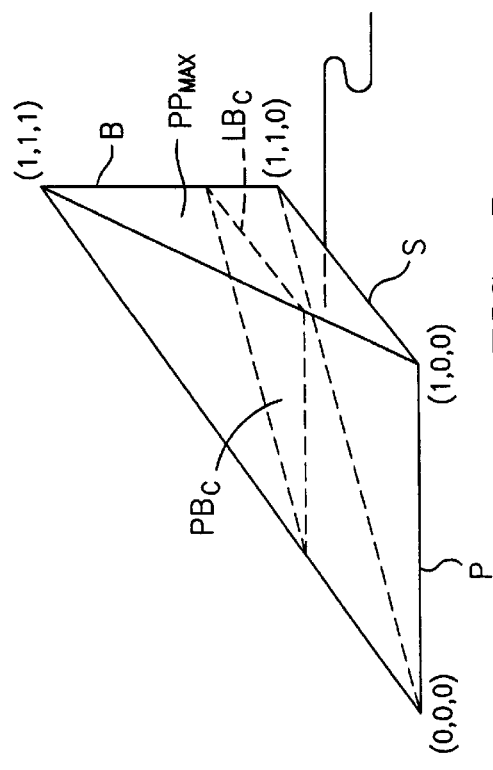
FIG. 5 is a geometric representation of the Dempster-Shafer frame of evidential reasoning used in accordance with the principle of the present invention.

Since it is necessarily true that $$p(A_i) \geq s(A_i) \geq m(A_i), \tag{11}$$

the space of allowable points that represents the elements of the power set is restricted to the interior and surface of a solid (right) triangle or wedge of unit height shown in FIG. 5.

Referring to FIG. 5, the relationship between the distribution of bpa in the frame and the measures of support and plausibility are geometrically illustrated. The point (1, 1, 1) is the "certainty point". That is, any element $A_i$ that is represented by this point has all the belief assigned directly to it, and therefore, also has a support and plausibility of one. If belief is redistributed from the element to its proper subsets, then the bpa of the element is reduced while both plausibility and support remain at a value of one. That is, the point representational of this moves down the belief line B, ((1, 1, 0)–(1,1,1)), until all the belief has been redistributed exclusively to is proper subsets. In that case, there is no belief in the set itself and the coordinate location is the "inclusion point" (1,1,0). If belief is now redistributed from the proper subsets into the supersets of $A_i$ and to sets that are non-subsets, but have non-empty intersection, the support for $A_i$ is reduced while its plausibility remains one. The point moves along the support line S, ((1,0,0)–(1,1,0)), until the "indismissable point" (1,0,0) is reached. Further redistribution of belief into the complement of $A_i$ and its subsets reduces plausibility. The motion of the point is along the plausibility line P, ((0,0,0)–(1,0,0)), until the "exclusion point" (0,0,0) is reached. At this point, all the belief is distributed to the complement of $A_i$ and its subsets. Other redistributions of belief to the subsets, supersets, and complement sets result in points located within or on the surface of the wedge defined by this plane. More than one subset of the frame may be located at a given point in the solid triangle.

In step 220, and in accordance with the geometric representation discussed above, the method of the present invention projects all the points into the plane of maximum plausibility $PP_{max}$, or the support-belief plane. A belief cut is defined as a plane of constant belief $PB_c$ which becomes a line of constant belief $LB_c$ when projected into the support-belief plane $PP_{max}$.

In step 230, the subsets are ranked by decreasing bpa. In the step 240, beginning with the subset(s) with the highest value of bpa, all subsets represented by points on the belief cut are unioned and the support of the resulting unioned set is computed. The method is repeated at the next highest level of belief, again taking the union of all the subsets in that belief cut and the previous one and computing its support. The method is continued until some pre-selected minimum threshold for support is met or exceeded. The final unioned subset contains all the hypotheses for further consideration. Since only those elements of the power set with non-zero bpa and their unions need to be enumerated, significant computational savings are yielded. The reasoning for performing step 240 is as follows. The support value for an element of the power set encompasses all the belief (bpa) which was allocated to the subsets of that element. Since it is desirable to contain a given level of belief in the final selection, as given by the threshold levels, and to concurrently obtain the smallest set of alternate modeling hypotheses for further processing, the support for the elements of the power set are obtained by summing bpa in decreasing order, which necessitates unioning the sets of hypotheses associated with the bpa values under consideration. Steps 230 and 240 attain the desired properties so belief containment with a minimal value.

Accordingly, this hypothesis selection method includes ranking subsets by bpa in step 230 and then forming the union of subsets in order of decreasing belief in step 240 until a support value threshold of the union is met or exceeded and a subset most closely modeling the actual sensed data is found. Until a model is found that most closely produces residuals with no discernable features is found, the steps are repeated using the unioned subset most closely meeting the threshold to select new models for use by alternate model store 19 for iteratively running the steps of FIG. 3.

Specifically, for steps 230, 240 and 250 let B be the ordered set $$B = \{B_1, \ldots, B_k\} \quad (12)$$

such that $$m(B_i) \geq m(B_j); j > i \quad (13)$$

and K is the number of elements in the power set with non-zero bpa, previously defined. Let $m_d$, d=1, 2, ... be the distinct values of belief and $n_d$ the number of sets with belief $m_d$. Let the number of sets from each of q belief cuts be $L_q$, where $$L_q = \sum_{d=1}^{q} n_d, q = 1, 2, \ldots, \text{ and} \quad (14)$$

define the union of sets of B's as $C_j$ $$C_j = \bigcup_{i=1}^{j} B_i \quad (15)$$

The selection criterion is then simply the set $C_{Lq}$ with the smallest value of q, such that its support meets or exceeds the threshold, λ, $$\min_{L_q} S(C_{Lq}) \geq \lambda \quad (16)$$

Since DS representation in computer software is most efficiently implemented by tracking only those subsets of the frame with non-zero belief, no additional elements beyond those with non-zero bpa need to be represented other than the few that result from the union operation. Further, since the sets are combined in order of decreasing belief, support for the union of the sets grows in the most efficient manner.

Figure 6:
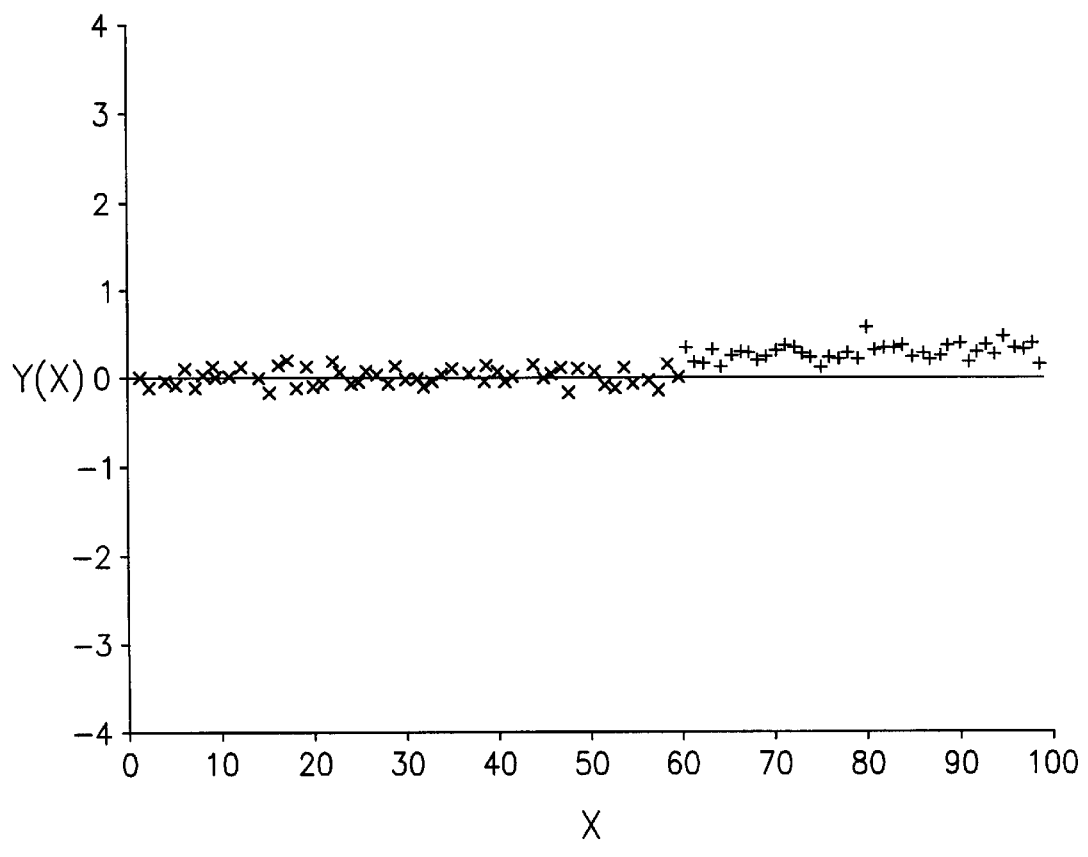
FIGS. 6–8 are graphical illustrations indicating the results of the use of the present application in connection with target tracking.
Figure 7:
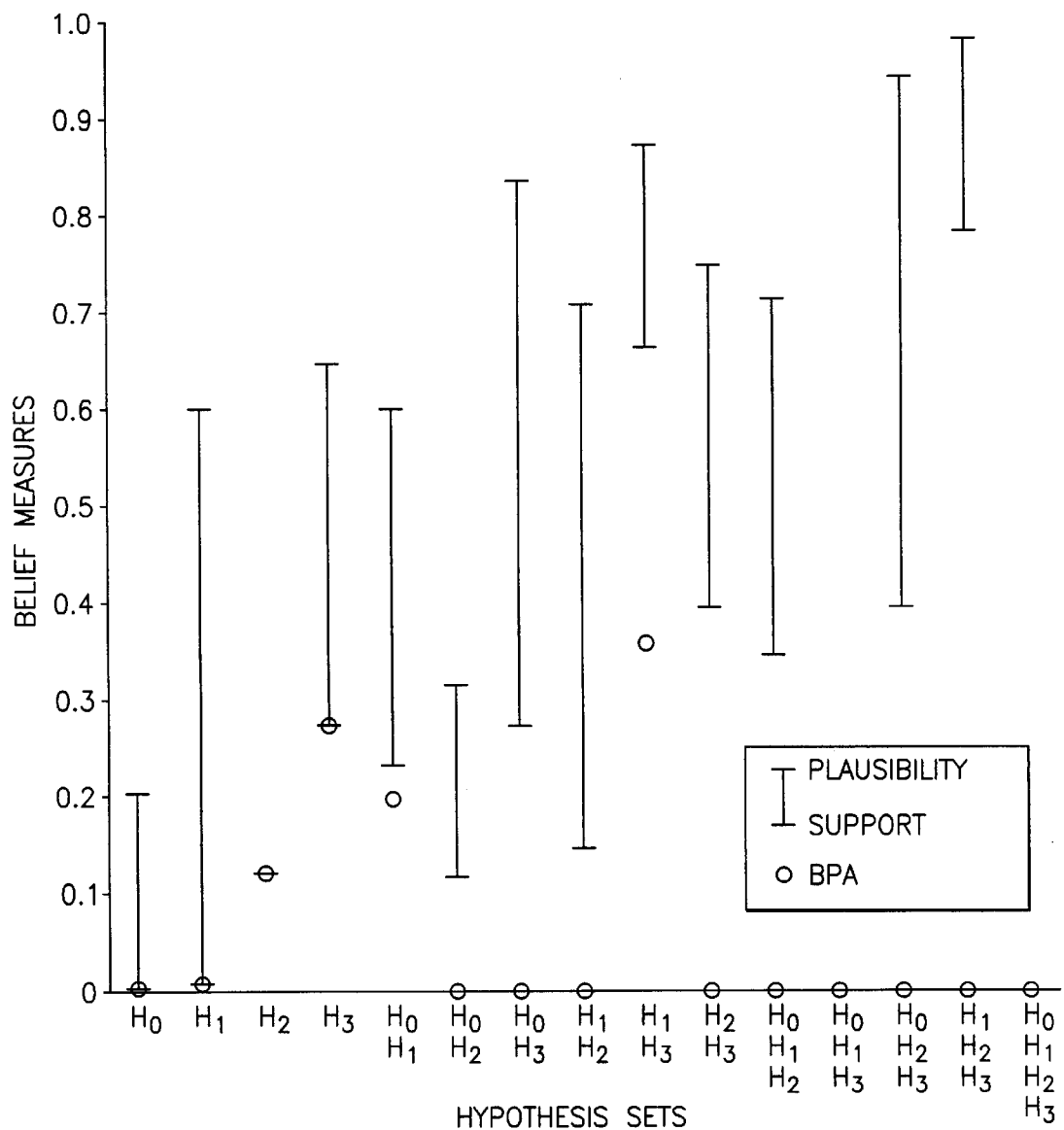

FIGS. 6, 7, 8 and 9 (i.e., Table 1), provide a graphical illustration of the use of the invention, and most particularly for the use of module 18 with the prior art target tracking system depicted in FIGS. 1A and 2. To evaluate the selection criterion, a limited set of experimental results were obtained for a generic frame of discernment with four hypotheses, {H0, H1, H2, H3}. As such, there are 15 elements in the power set in accordance with equation (2) set forth in the Background section and shown in FIG. 4. As an illustrative example, FIG. 6 depicts an example of an input to block 14 in FIG. 1. The output of blocks 14–17 is simulated in the following manner. For testing the system, a uniformly distributed random variable was used to select (i) the number of elements in the power set which would have non-zero bpa, (ii) which particular elements to use, and (iii) the amount of bpa those elements received. The use of random variable with a uniform distribution means that the experimental method is as likely to select one number from within the allowable range as any other. A number of these trials were performed and one was selected as a typical example for illustrative purposes here. The production of Table 1, shown in FIG. 9, by this experimental method, is described as follows. The five values to be used would be {H1, H3}, {H0, H1}, {H3}, {H2}, and {H1} and the bpa values for the five selected elements would be 0.37, 0.20, 0.28, 0.12 and 0.03, respectively. These five elements add up to 1.00 as required. The additional elements as well as the support and plausibility values for all elements are shown in the table for completeness.

The model selection method, as used in the target tacking system application of FIGS. 1, 1A, and 2 of the prior art, can be explained as follows. FIGS. 6, 7, 8, FIG. 9 (i.e., Table 1), and FIGS. 10A and 10B, Tables 2 and 3, provide a pictorial explanation of the internal model selection method in conjunction with the tracking system application. Referring to FIGS. 1 and 2, the output of Module 11 are the features which are interpreted by the evidentiary reasoning system, i.e., Modules 14–17. A graphical interpretation of the output from Model 11 as seen by Modules 14–17 is shown, graphically in FIG. 6, wherein the x's indicate unbiased data and the +'s indicated biased, feature altered data. As stated earlier in the disclosure, Modules 14–17 determine the likelihood that particular features are present, and if present, the belief that such features have amplitudes which fall in fuzzily defined regions (e.g., weak, moderate, strong). Modules 14–17 subsequently combine and interpret the features. The output of Module 17 of the determined support for each subset, serving as the input to Module 18, is graphically portrayed by FIG. 7, which is also a graphical representation of Table 1.

The model selection method for the DS frame of evidential reasoning via Module 18 in accordance with the present invention explained. In accordance with the present invention, Module 18 implements the DS frame of evidential reasoning as illustrated in one example described in,the following paragraph. Further, the wide adaptability of the process of Module 18 to fit conclusions needing to be drawn will be illustrated with a simple selection of a threshold criteria.

In the example, a selection criterion of at least 80% of the bpa to support the selected element is chosen. Referring to FIG. 9 showing Table 1, all elements of the power set, as discussed above, are shown with the bpa values resulting from application of the evidentiary reasoning system. For illustrative purposes, all belief, support and plausibility values are shown in the table. However, only those elements which have non-zero beliefs computed by the system 200 of the present invention are used as input to the model selection method of Module 18, in accordance with step 210 of FIG. 3. In the selection method of the system 200 and step 230, the elements or subsets of the power set received are first sorted by decreasing bpa value, as shown in Table 2 of FIG. 10A. The sorted numbers correspond to those given by equations (12) and (13). Applying the selection criterion of step 240, unions of the ordered sets $C_i$, as described in equation 15, are obtained at the successive level cuts as shown in Table 3, of FIG. 10B. Referring to Table 1 of FIG. 9 and step 230 of FIG. 3 the subsets of the frame, as discussed above, are arranged in order of decreasing (and non-zero) bpa, producing the subset ranking, [H1, H3], [H3], [H0, H1], [H2], and [H1] with bpa of 0.37, 0.28, 0.20, 0,12, and 0.03, respectively. With respect to performing unioning in accordance with step 240 and applying the selection algorithm, the unioned subsets at the successive level cuts comprise [H1, H3] with support 0.68, [H, 0, H1, H3] with support 0.88, and [H0, H1, H2, H3] with support 1.0. For the chosen selection criterion that the support of the selected element of the power set encompass at least 80% of the bpa, the element selected would be the one corresponding to union number C3, or set {H0, H1, H3} in accordance with step 250 as described in equation (16).

Figure 8:
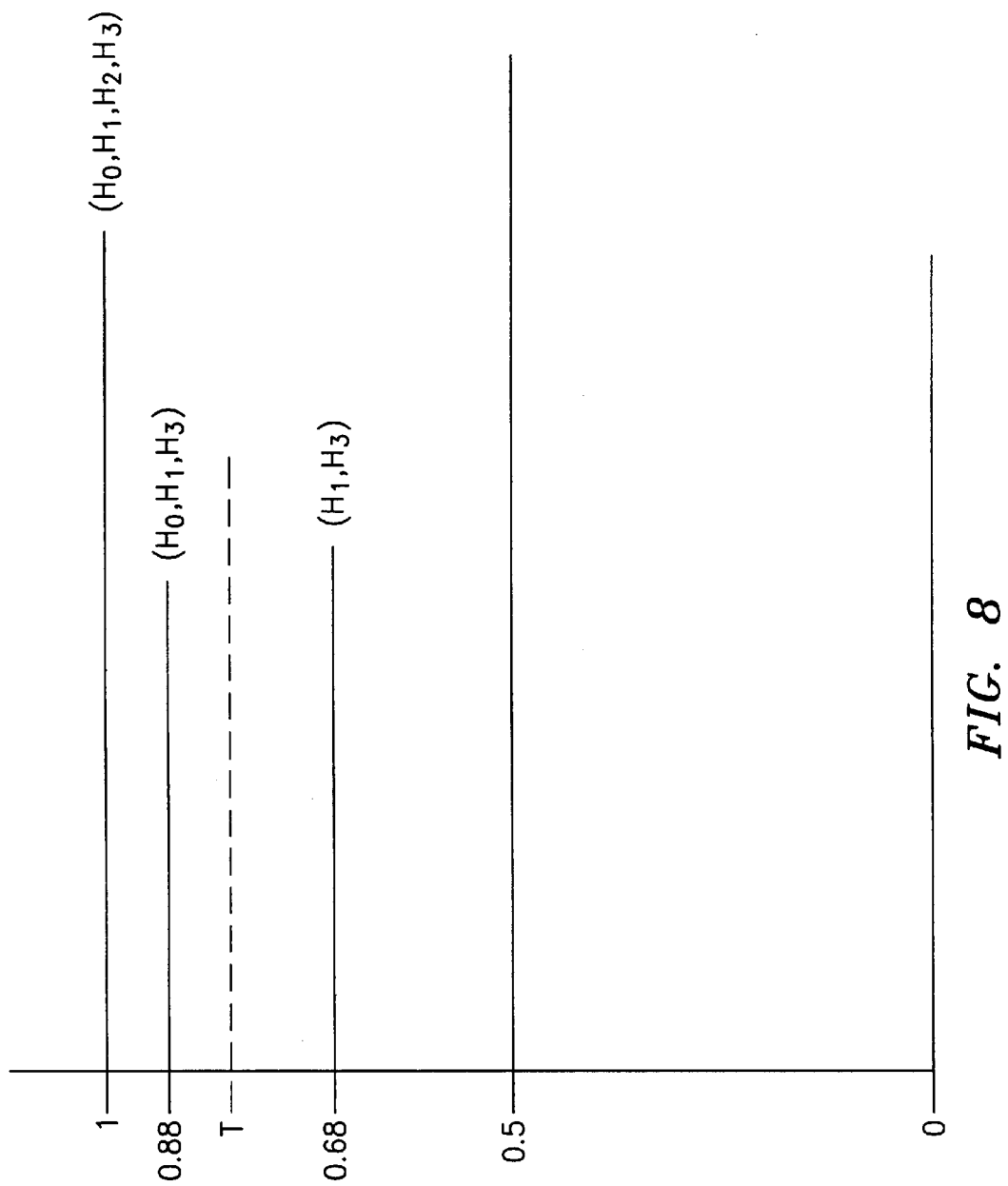

Referring to FIG. 8, a graphical representation of the selection method is shown. Due to the DS frame of evidential reasoning, only those elements of the power set with non-zero bpa need to be tracked, thus saving time in computing the support and plausibility values for the remaining elements of the power set. For this example, only two support values need be computed, one for {H1, H3} and one for {H0, H1, H3}, out of a possible total of fifteen support values. Since the number of elements in a power set, K, grows exponentially as a power of two, frames of discernment with even a modest number of hypotheses will have a large number of elements in the power set. For instance, this power set with four hypotheses in the frame of discernment has fifteen elements, but a more realistic frame of discernment with only eight hypotheses would have 255 elements. Also, since the selection algorithm only uses support as an indicator of belief, only a single plausibility value need be computed. However, this does not preclude generation of plausibility values for other elements of the power set.

This invention provides a method for accurately selecting models of physical phenomena. The invention entails the development of a hypothesis selection criterion for the DS frame of discernment, and has applicability to fuzzy logic based systems and rule based systems as well. This method accumulates belief such that a selection is made in the most efficient manner, i.e., with the fewest computations possible. This can become important in that while the example given in Table 1 only show reasoning over 15 elements in the power set for 4 hypotheses, if the number of hypotheses were doubled, the number of elements in the power set to reason over would be 255, however, the maximum number of support computations required by the selection criterion described herein would be 8.

This invention can be used in any system that required an efficient method for hypothesis selection. In addition, while the application of the selection criterion focuses on DS evidential reasoning, the technique may also have application to other reasoning systems, i.e., fuzzy sets, possibility theory and Bayesian theory. Accordingly, while this invention has been described with application to the DS frame of evidential reasoning, the invention as described above is also extendable for use with fuzzy sets.

As alternatives to the above disclosure, several other selection criteria for the subsets of the DS frame that involved distance measures were examined. The first such measure is the distance of a subset from the certainty point (1,1,1). In this method, subsets are collected (unioned) until the accumulated belief exceeds some threshold. Since the frame $\theta_N$ is located on the belief line ((1,1,0)–(1,1,1)), it is always included once the radius has reached a value of one. Consequently, if the belief threshold has not been reached before the frame is encountered, a complex set of logic must be invoked. In addition to the logic problem, all the elements in the power set must be represented, which as noted previously, can be a large number for modest frames. A second alternative method includes examining the distribution of points when projected down into the plane of no belief or the plausibility-support plane. This technique is subject to the same limitations as the first method.

The primary advantage of this invention is that a method and system in provided for the efficient selection of hypothesis for modeling physical phenomena based on the results of an evidential reasoner. Another advantage of this invention is that a method and system is provided for assessing models of motion of physical phenomena through a fluid, which motion causes an acoustic signal that traverses an uncertain path which is received by sensors with uncertain biases, in the presence of noise. Still another advantage of this invention is that a method and system is provided for ranking hypothesis of models of physical phenomena, such that the processing capability of the system using the method and system is provided of the present invention is enhanced. And still another advantage of this invention is that a method and system is provided for accurately and efficiently selecting models of physical phenomena which entails a development of hypothesis selection criterion and which is applicable to the Dempster-Shafer frame of evidential reasoning as well as fuzzy logic based systems and rule based systems. Yet another advantage of this invention is that a method and system is provided for efficiently selecting models of physical phenomena such that the selection is made in the most efficient manner with the fewest computations possible.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for the selection of hypotheses for modeling physical phenomena, comprising the selection steps of:

sensing actual data from said physical phenomena;

providing an initial model of said physical phenomena comprising parameter values which represent said actual data if said actual data was sensed in the absence of noise;

detecting if selected features are present by analyzing said actual data and parameter values;

extracting said selected features if present using hypotheses for estimating said selected features;

comparing said hypotheses to said actual data for determining a belief probability assignment value for each of said hypotheses which indicates the likelihood that said selected features exist in said actual data and the likelihood that such selected features cannot accurately be determined as existing due to the presence of noise and for determining the strength and variance of said estimated selected features as represented by said hypotheses relative to said actual data;

selecting a set of said hypotheses believed to most accurately model said physical phenomena based on said belief probability assignment values of said hypotheses meeting a predetermined criteria;

determining subsets of said set and a subset belief probability for each of said subsets;

generating evidential support values and lack of evidential support values for each of said subsets having non-zero subset belief probability assignment values, wherein said evidential support value is indicative of the amount of confirming evidence for each of said hypotheses and said lack of evidential support value is indicative of a lack of supporting evidence for each of said hypotheses;

ranking said subsets having non-zero subset belief probability assignment values in order of decreasing subset belief probability assignment values for forming a power set;

unioning subsets of said power set for forming unioned subsets and determining unioned evidential support values for said unioned subsets and unioned belief probability assignment values for said unioned subsets;

thresholding said unioned subsets by comparing said unioned evidential support values to a predefined threshold value; and using at least one of said unioned subsets having a unioned evidential support value most closely approximating or exceeding said threshold value for selecting alternate models having selected features which more closely approximate said actual data.

2. The method according to claim 1 further comprising the step of iteratively repeating said selection steps until a unioned subset having a unioned evidential support value equalling or exceeding said threshold value is determined.

3. The method according to claim 1 wherein the step of thresholding includes defining said threshold value as having a value less than one.

4. The method according to claim 3 wherein said step of thresholding further comprises selecting said unioned subset having a unioned evidential support value meeting said threshold value.

5. The method according to claim 1 wherein said step of generating further includes using the Dempster-Shafer frame of evidential reasoning for generating said evidential support values and lack of evidential support values for each of said subsets having non-zero subset belief probability assignment values.

6. The method according to claim 1 wherein said step of unioning includes combining said subsets of said power set in order of decreasing subset belief probability assignment values.

7. The method according to claim 6 wherein said step of unioning comprises:

designating a one of said subsets with a highest subset belief probability assignment value as the first unioned subset;

combining said first unioned subset with another one of said subsets having a next highest subset belief probability assignment and creating a next unioned subset;

further combining said next unioned subset with another one of said subsets having a next highest belief probability assignment and creating a new next unioned subset; and repeating said step of combining said next unioned subset for said new next unioned subset.

8. The method according to claim 1 further comprising the step of ranking said unioned subsets in order of decreasing unioned belief probability assignment values.

9. The method according to claim 1 further comprising the step of attributing actual values to said actual data.

10. The method according to claim 9 further comprising the step of determining residual values indicative of differences between said actual values and said parameter values.

11. The method according to claim 10 wherein said step of detecting further comprises analyzing said residual values while analyzing said actual data and said parameter values.

12. The method according to claim 10 wherein said step of extracting comprises applying said hypotheses estimating selected features to said residual values.

13. The method according to claim 1 further comprising the steps determining a level of belief in said strength and variance.

14. A system for the selection of hypotheses for modelling physical phenomena, comprising:

means for sensing actual data from said physical phenomena;

initial model storage means for providing an initial model of said physical phenomena comprising parameter values which represent said actual data if said actual data was sensed in the absence of noise;

feature estimator means for detecting if selected features are present by analyzing said actual data and parameter values;

feature extraction means for extracting said selected features if present by using hypotheses for estimating said selected features;

feature representation means for comparing said hypotheses to said actual data for determining a belief probability assignment value for each of said hypotheses which indicates the likelihood that said selected features exist in said actual data and the likelihood that such selected features cannot accurately be determined as existing due to the presence of noise and for determining the strength and variance of said estimated selected features as represented by said hypotheses relative to said actual data;

feature interpretation means for selecting a set of said hypotheses believed to most accurately model said physical phenomena based on said belief probability assignment values of said hypotheses meeting a predetermined criteria determining subsets of said set and a subset belief probability for each of said subsets;

evidential reasoning means for generating evidential support values and lack of evidential support values for each of said subsets having non-zero subset belief probability assignment values, wherein said evidential support value is indicative of the amount of confirming evidence for each of said hypotheses and said lack of evidential support value is indicative of a lack of supporting evidence for each of said hypotheses, and further for ranking said subsets having non-zero subset belief probability assignment values in order of decreasing subset belief probability assignment values for forming a power set;

model selection means for unioning all subsets of said power set for forming unioned subsets and determining unioned evidential support values for said unioned subsets and unioned belief probability assignment values for said unioned subsets, and for thresholding said unioned subsets by comparing said unioned evidential support values to a predefined threshold value; and alternate model storage means for using at least one of said unioned subsets having a unioned evidential support value most closely approximating or exceeding said threshold value for selecting alternate models having selected features which more closely approximate said actual data.

15. The system according to claim 14 further comprising means for iteratively repeating said selection steps until a unioned subset having a unioned evidential support value equalling or exceeding said threshold value is determined.

16. The system according to claim 14 wherein said threshold value has a value of less than one.

17. The system according to claim 16 wherein said model selection means further includes means for selecting said unioned subset having a unioned evidential support value meeting said threshold value.

18. The system according to claim 14 wherein said evidential reasoning means comprises means for implementing the Dempster-Shafer frame of evidential reasoning for generating said evidential support values and said lack of evidential support values for each said subsets having non-zero subset belief probability assignment values.

19. The system according to claim 14 wherein said model selection means comprises means for combining said subsets of said power set in order of decreasing subset belief probability assignment values.

20. The system according to claim 19 wherein said means for combining comprises:

means for designating a one of said subsets with a highest subset belief probability assignment value as the first unioned subset;

means for combining said first unioned subset with another one of said subsets having a next highest subset belief probability assignment and creating a next unioned subset;

means for further combining said next unioned subset with another one of said subsets having a next highest belief probability assignment and creating a new next unioned subset; and means for repeating said step of combining said next unioned subset for said new next unioned subset.

21. The system according to claim 14 wherein said evidential reasoning means includes means for ranking said unioned subsets in order of decreasing unioned belief probability assignment values.

22. The system according to claim 14 wherein said means for sensing comprises means for attributing actual values to said actual data.

23. The system according to claim 22 wherein said feature estimator means includes means for determining residual values indicative of differences between said actual values and said parameter values.

24. The system according to claim 23 wherein said feature estimator means further comprises means for analyzing said residual values while analyzing said actual data and said parameter values.

25. The system according to claim 23 wherein said feature extraction means includes means for applying said hypotheses to said residual values for estimating said selected features.

26. The method according to claim 14 wherein said feature and hypotheses representation means includes means for determining a level of belief in said strength and variance.

27. The system according to claim 14 wherein said physical phenomena comprises a moving target and said selected features comprise at least one of linear drift in a sensed signal from said target, discontinuity in said sensed signal, jump in said sensed signal, non-linearity of said sensed signal, and curvature of said sensed signal.

* * * * *